Figure 5:
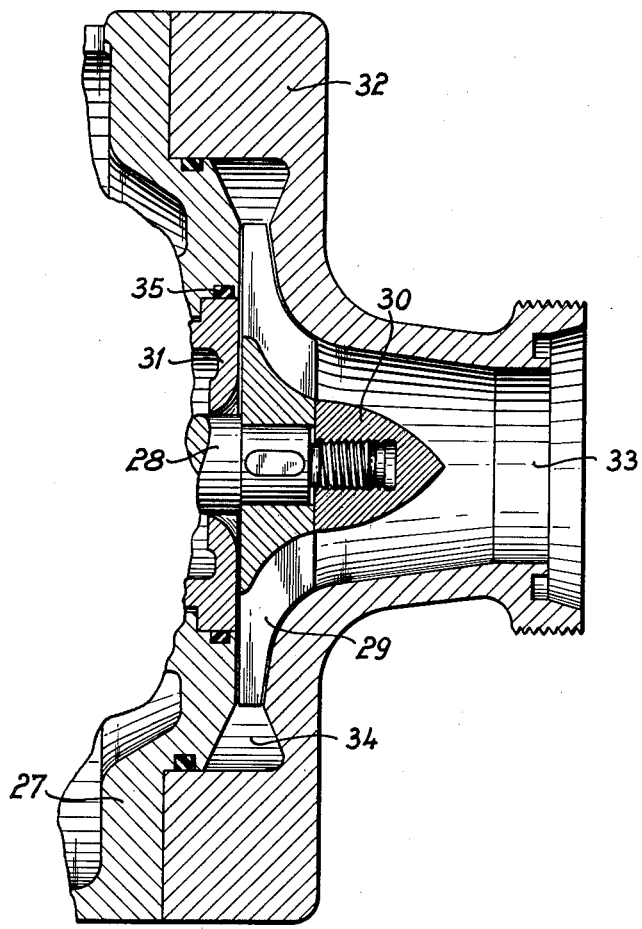

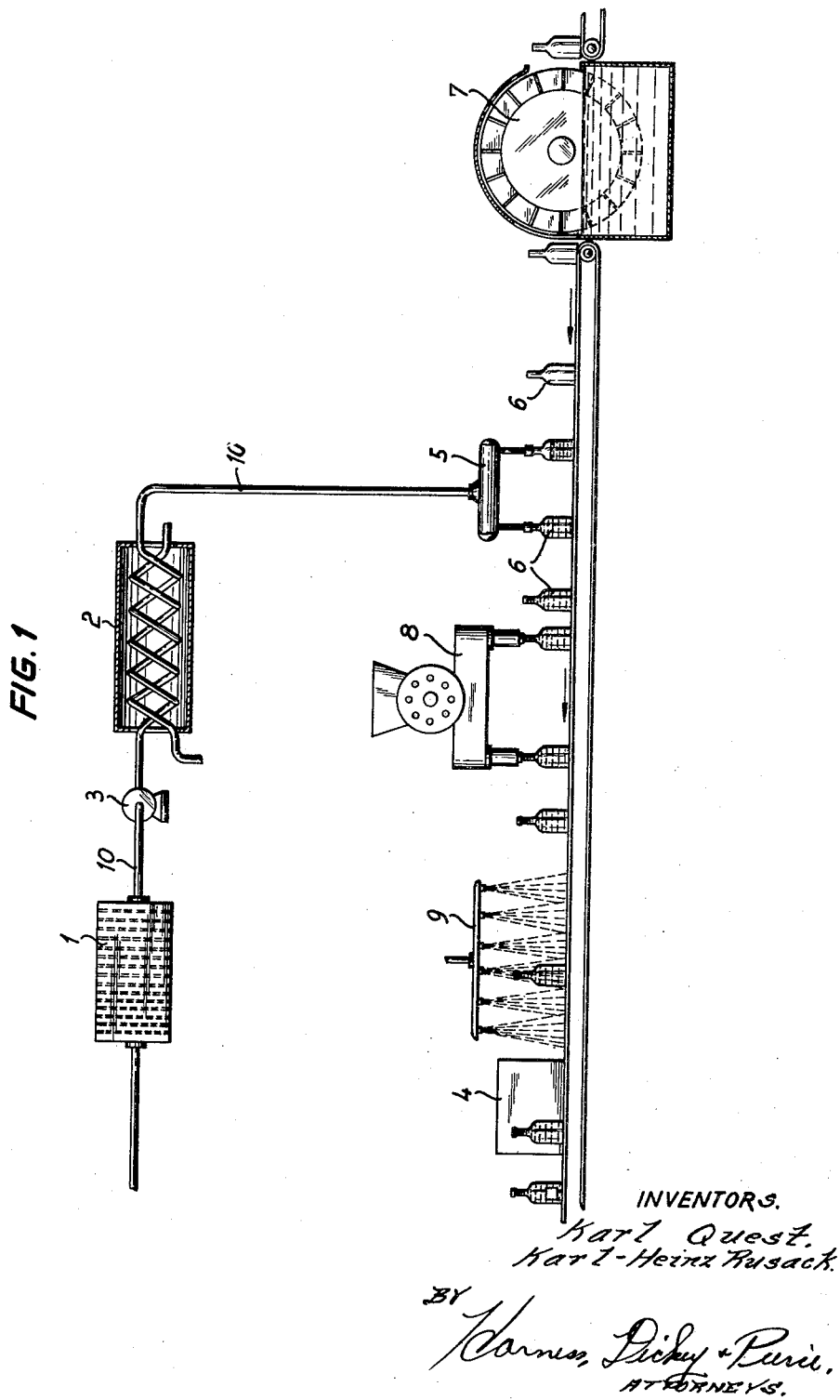

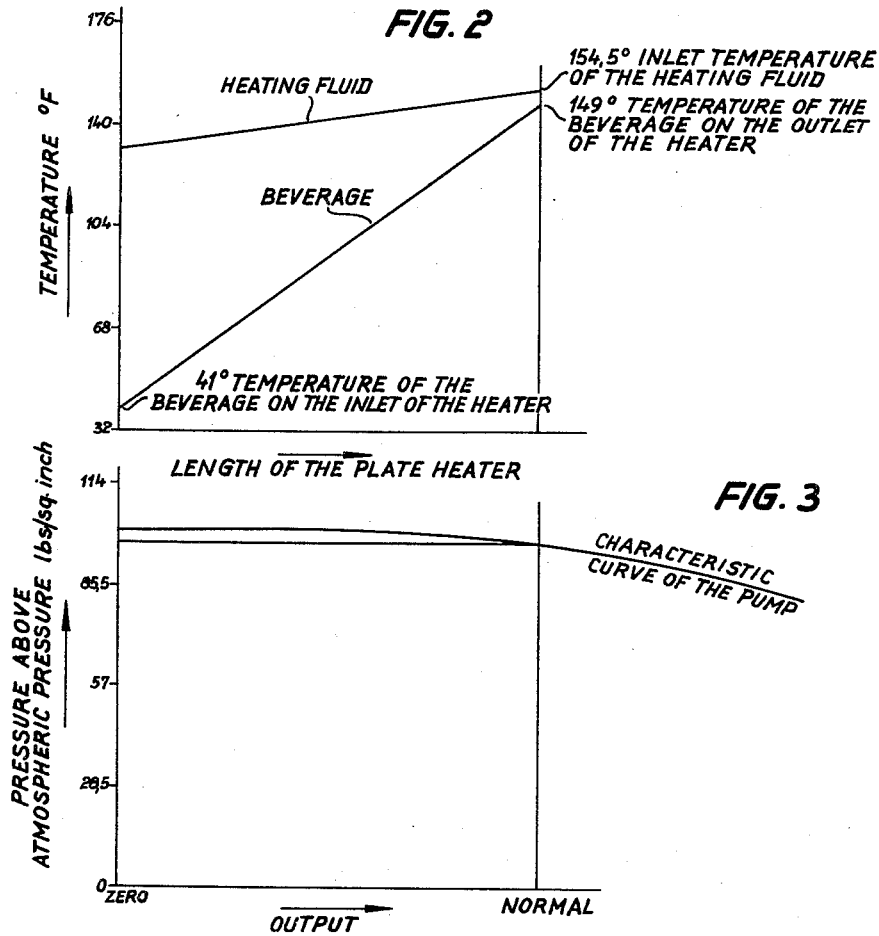
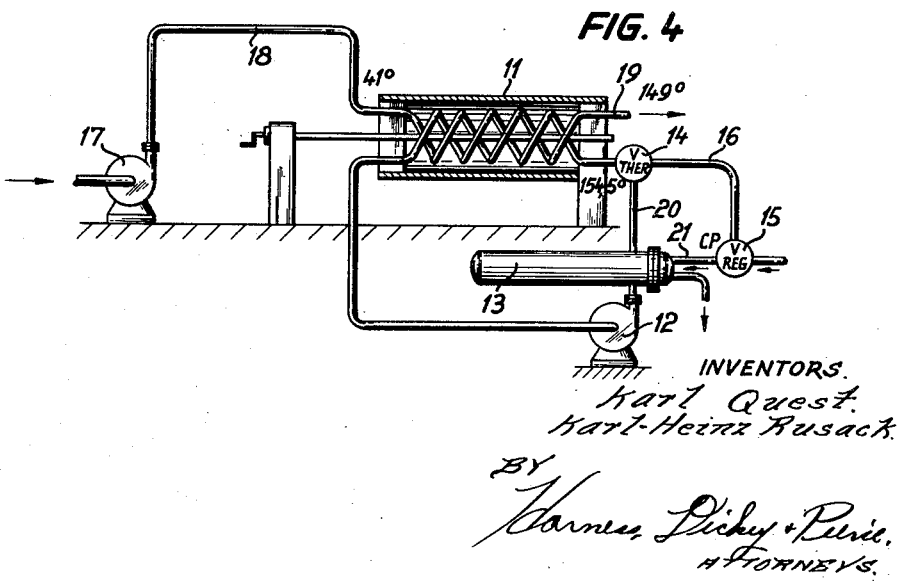

Sept. 11, 1962 K. QUEST ET AL 3,053,669
METHOD AND APPARATUS FOR HEATING OF ESPECIALLY CARBON
DIOXIDE CONTAINING BEVERAGES PRIOR TO HOT-RACKING
Filed March 17, 1959 4 Sheets-Sheet 4

INVENTORS.
Karl Quest.
Karl-Heinz Rusack.

3,053,669
METHOD AND APPARATUS FOR HEATING OF ESPECIALLY CARBON DIOXIDE CONTAINING BEVERAGES PRIOR TO HOT-RACKING
Karl Quest, Dortmund-Korne, and Karl-Heinz Rusack, Mannheim, Germany, assignors to Dr. Bruno Kaiser, Hamburg, and Dr. Emil Pauls, Hamburg-Eidelstedt, Germany
Filed Mar. 17, 1959, Ser. No. 799,874
Claims priority, application Germany Mar. 17, 1958
1 Claim. (Cl. 99—211)

The invention relates to a method of heating beverages prior to hot-racking, particularly involving carbon dioxide-containing beverages, for instance beer.

The invention especially refers to an improvement and further development of the pending patent applications Serial No. 570,770, filed March 12, 1956, now Patent No. 2,897,082, issued July 28, 1959, and Serial No. 746,903, filed July 7, 1958.

Patent No. 2,897,082 refers to a method of filling containers adapted to be used for direct consumption with carbon-dioxide-containing beverages, comprising the steps of heating a carbon dioxide-containing beverage to the pasteurization temperature thereof for sufficient time to pasteurize the same, providing a container adapted to be used for direct consumption, heating and sterilizing said container, introducing said pasteurized carbon dioxide-containing beverage while still hot into said heated and sterilized container with a counter-pressure filler, and sealing said container.

According to patent application Serial No. 746,903, a pressure difference feeler is arranged in rear of the heater for the beverage, controlling a regulating valve in front of the heater and keeping the beverage under a constant pressure. By virtue of this arrangement the beverage gets into the counter-pressure filler at a substantially constant pressure. Here the beverage is racked into the containers (bottles or tins) destined for direct use, in a known manner while maintaining a counter-pressure slightly in excess of the saturation pressure of the beverage at a certain temperature and a certain $CO_2$-content. If, for instance, beer contains $17\!/\!_{32}$ ounce $CO_2$ per gallon and has a temperature of 158° F., the counter-pressure must amount to at least 85 lbs./sq. inch above atmosphere.

When heating these beverages, a careful balancing of pressure and temperature is required, as otherwise the beverage will unfavourably be influenced and may for instance change in taste or colour.

When racking beverages of such kind, standstills in operation may occasionally occur, be it that not enough empty bottles are available or that subsequent parts of the plant, as for instance the labelling machine, fail. In this case, the filler must be stopped, and the beverage normally flowing uniformly through the heater comes to a standstill. It would not be to the purpose if the one pump transporting the beverage through the heater and the other pump transporting the hot water as heating medium through the heater, were stopped, as this would only add to the disadvantageous effects of an interruption in operation.

In order to protect the beverage from detrimental influences when the output of the heating plant equals zero, it is proposed in accordance with the invention to transport the beverage through the heater by a pump with a flat characteristic curve between the nominal output and output zero, the temperature of the heating medium being only slightly in excess of the heating temperature.

In order to carry out the method, the plant comprises on the one hand a pump having an annular passage of uniform cross section extending over its entire circumference and a discharge pipe extending tangentially therefrom which initially shows a cylindrical and later on a conical form, and on the other hand a heater with large heat exchanging areas and low flow resistance.

According to the invention, a temperature sensor for regulating the temperature of the water of a hot water circulating plant is built into the hot water inlet passage of the heater.

These measures according to the invention make it possible to eliminate a buffer tank which would have to be arranged between the heater and the filler. The pump for the beverage need not interrupt its operation, and the beverage may remain in the heater without being exposed to any detrimental effects, when the filler temporarily stops operation.

The method according to the invention and the plant used for carrying out the process are explained in more detail in the accompanying drawings.

Figure 6:
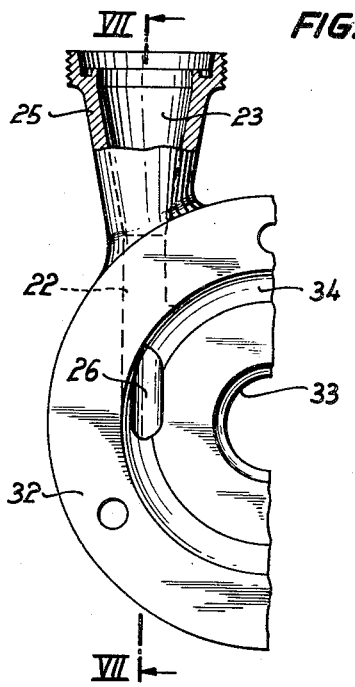
Figure 7:
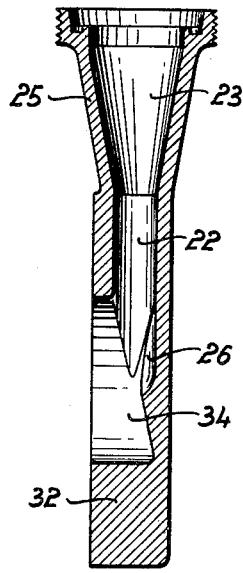

In the drawings:

FIG. 1 shows an apparatus for hot-racking beer,

FIG. 2 is a temperature flow sheet for a plate heater heated in accordance with the invention, FIG. 3 is a pressure output diagram of a pump designed in accordance with the invention, FIG. 4 is a schematic view of an apparatus designed in accordance with the invention, for heating the beverages, FIG. 5 is an axial section through a pump according to the invention, FIG. 6 is a view on the cover of the pump shown in FIG. 5, partly sectioned, FIG. 7 is a section through the diffusion pipe of the pump shown in FIGS. 5 and 6 taken on line VII—VII of FIG. 6.

According to FIG. 1, the beer is supplied from a storage tank (not shown) through a filter 1 via a conduit 10 to a pump 3 forcing the beer through a heat exchanger 2, which in a known manner is particularly designed as a plate heater for continuous discharge. Any of various known types of heat exchangers could be used. In this heat exchanger 2, the beer is heated to pasteurizing temperature. From the heat exchanger 2, the beer is fed into the counter-pressure filler 5, by means of which bottles leaving a cleaning machine 7 are racked under counter-pressure. The bottles 6 are closed in a crown corking machine 8 and subsequently cooled by the cooling device 9. From here, the bottles are transported to a labelling machine 4.

According to FIG. 2, the temperature of the heating medium, for instance water, is when entering the heat-exchanger 2, e.g. 154.5° F. The beverage enters the heater at a temperature of 41° F. and leaves it during the racking operation with a temperature of 149° F. If the beverage remains in the heat-exchanger because of an interruption in the racking process, the temperature may rise to a maximum of 154.5° F. At this temperature increase of about 5.5° F., there will be no detrimental effect to the beverage, as for the sake of safety, the counter-pressure in the total apparatus lies slightly in excess of the carbon dioxide saturation pressure.

FIG. 3 shows the characteristic curve of a pump according to the invention which, within the range between the nominal output and the output zero is especially flat. If following an interruption in the racking operation, the output drops to zero, a pressure increase of 2.8 lbs./sq. inch will occur. Also this will have no detrimental bearing on the beverage.

According to FIG. 4, the apparatus for heating the beverage substantially consists of the pump 17 and the heater 11. As heater, a plate type heat exchanger has been selected. Furthermore an apparatus for preparing hot water has been provided including a hot water circulating pump 12, a counter-flow apparatus 13, a temperature senser 14 and the steam valve 15. In any case, the necessary piping also belongs to the plant.

The beverage is fed from the tank to the pump 17 by which it is passed via a pipe 18 through the heater 11, from where it flows through a pipe 19 to the counter-pressure filler. As heating medium, water is forced by means of a circulating pump 12 via a pipe 20 through the counter-flow apparatus 13 where the water absorbs the required amount of heat with which it is supplied through a steam pipe 21 via a steam valve 15. From the counter flow apparatus 13, the hot water flows to the temperature senser 14, which over a remote conduit 16 controls the steam valve 15. From here the hot water enters the heater 11 at constant temperature and flows in a counter direction to the beverage through the heater and back to the pump 12.

The FIGS. 5–7 show the substantial cross sections of the pump for the beverage. A shaft 28 is supported in the housing 27 having an impeller 29 fixed on its end fastened by a nut 30. Sealing of the fluid chamber is effected by means of an insert 31 and a gasket 35. The cover 32 is provided with suction pipes 33. The annular passage 34 which is of triangular cross section, is defined by the cover 32 and the housing 27, the cover 32 forming the outer side parallel to the axis and one side of the cross section. The cross section remains constant over the entire circumference. A pressure pipe 25 is arranged on the cover 32 and has its opening 26 tangentially fixed to the annular passage 34. The pressure pipe 25 has a circular cross section, which in its first part 22 is cylindrical and then in its subsequent section 23 enlarges into a conical form.

What we claim is:

In a method for treating a carbon dioxide containing beverage, such as beer, prior to hot-racking it into containers for direct consumption at a flow rate which is subject to variation or stoppage and for preventing a substantial rise in beverage temperature and pressure during such variation or stoppage, the steps of pumping said beverage with a predetermined rated outlet pressure, limiting said pressure to only a slight rise upon stoppage of the flow of said beverage, passing said beverage from said pump through a heat exchanger to a hot-racking station, maintaining a counterpressure at said hot-racking station slightly in excess of the carbon dioxide saturation pressure at the temperature at which the beverage is heated by said heat exchanger, supplying said heat exchanger with a heating medium in a flow direction counter to the flow of said beverage, and maintaining the temperature of said heating medium at its entrance to said heat exchanger only slightly in excess of the temperature at which said carbon dioxide containing beverage will be pasteurized, whereby the temperature and pressure of said beverage will be prevented from rising substantially upon stoppage of the beverage flow.

References Cited in the file of this patent

UNITED STATES PATENTS

| | | |
|---|---|---|
| 1,128,822 | Sparks | Feb. 16, 1915 |
| 1,291,037 | Lole | Jan. 14, 1919 |
| 1,328,061 | Smith et al. | Jan. 13, 1920 |
| 2,001,344 | Fielder | May 14, 1935 |
| 2,135,216 | Olson | Nov. 1, 1938 |
| 2,254,917 | Schroder | Sept. 2, 1941 |
| 2,756,739 | Schaub | July 31, 1956 |
| 2,778,607 | Leoni | Jan. 22, 1957 |